US008189317B2

(12) United States Patent
Oh et al.

(10) Patent No.: US 8,189,317 B2
(45) Date of Patent: May 29, 2012

(54) GROUNDING BRUSH SYSTEM FOR MITIGATING ELECTRICAL CURRENT ON ROTATING SHAFTS

(75) Inventors: Hieyoung W. Oh, Bowdoing, ME (US); Adam H. Willwerth, North Yarmouth, ME (US); Jeffrey W. Richardson, Otisfield, ME (US)

(73) Assignee: Illinois Tool Works Inc., Glenview, IL (US)

( * ) Notice: Subject to any disclaimer, the term of this patent is extended or adjusted under 35 U.S.C. 154(b) by 330 days.

(21) Appl. No.: 12/098,573

(22) Filed: Apr. 7, 2008

(65) Prior Publication Data

US 2008/0258576 A1 Oct. 23, 2008

Related U.S. Application Data

(60) Provisional application No. 60/925,833, filed on Apr. 23, 2007.

(51) Int. Cl.
*H05F 3/00* (2006.01)
*H05F 3/02* (2006.01)
*G03G 15/02* (2006.01)

(52) U.S. Cl. ......... 361/221; 361/220; 361/225; 310/309
(58) Field of Classification Search .................. 361/221, 361/220, 225; 310/309
See application file for complete search history.

(56) References Cited

U.S. PATENT DOCUMENTS

| | | | | |
|---|---|---|---|---|
| 3,873,835 A | * | 3/1975 | Ignatjev | 250/324 |
| 4,197,970 A | * | 4/1980 | Plumadore | 226/94 |
| 4,281,328 A | * | 7/1981 | Shores | 343/763 |
| 4,307,432 A | * | 12/1981 | Nishikawa | 361/221 |
| 4,398,113 A | * | 8/1983 | Lewis et al. | 310/232 |
| 4,494,166 A | | 1/1985 | Billings et al. | |
| 4,535,264 A | * | 8/1985 | Allport | 310/232 |
| 4,994,861 A | | 2/1991 | Brandon et al. | |
| 5,139,862 A | | 8/1992 | Swift et al. | |
| 5,270,106 A | | 12/1993 | Orlowski et al. | |
| 5,354,607 A | | 10/1994 | Swift et al. | |
| 5,661,356 A | | 8/1997 | Fisher et al. | |
| 5,804,903 A | * | 9/1998 | Fisher et al. | 310/248 |
| 6,048,119 A | | 4/2000 | Kato et al. | |
| 6,517,357 B1 | | 2/2003 | Athanasiou et al. | |
| 7,136,271 B2 | | 11/2006 | Oh et al. | |
| 7,193,836 B2 | | 3/2007 | Oh et al. | |
| 7,521,827 B2 | * | 4/2009 | Orlowski et al. | 310/68 R |
| 2003/0086630 A1 | | 5/2003 | Bramel et al. | |
| 2006/0007609 A1 | | 1/2006 | Oh et al. | |
| 2007/0040459 A1 | | 2/2007 | Oh | |

FOREIGN PATENT DOCUMENTS

EP 1523086 A 5/2005

(Continued)

OTHER PUBLICATIONS

Rockwell Automation, Inverter-Driven Induction Motors Shaft and Bearing Current Solutions, Mar. 11, 2002. R.F. Schiferl & M.J. Lelfi; Bearing Current Remediation Options; IEEE Industry Applications Magazine; Jul./Aug. 2004.

(Continued)

*Primary Examiner* — Rexford N Barnie
*Assistant Examiner* — Zeev Kitov
(74) *Attorney, Agent, or Firm* — Taylor IP, P.C.

(57) ABSTRACT

An improved grounding brush system for mitigating electrical current on a moving object such as a rotating shaft includes an electrically conductive layer applied to the object and associated with a brush assembly for conducting electrical current from the moving object to ground.

3 Claims, 2 Drawing Sheets

FOREIGN PATENT DOCUMENTS

| | | |
|---|---|---|
| JP | 402168595 A | 6/1990 |
| JP | 04368446 A | 12/1992 |
| JP | 406036887 A | 2/1994 |
| JP | 406199010 A | 7/1994 |
| JP | 2005151749 A | 6/2005 |
| WO | WO97/01200 A | 1/1997 |

OTHER PUBLICATIONS

Poly-Scientific; Fiber Brush Slip Ring Technology for Mission-Critical Aerospace and Military Applications; Northrop Grumman Component Technologies.

* cited by examiner

GROUNDING BRUSH SYSTEM FOR MITIGATING ELECTRICAL CURRENT ON ROTATING SHAFTS

CROSS-REFERENCE TO RELATED APPLICATIONS

The present application claims the benefits of U.S. Provisional Application Ser. No. 60/925,833 filed on Apr. 23, 2007.

TECHNICAL FIELD

The present invention relates generally to grounding assemblies, and, more particularly, to grounding assemblies for moving objects including rotating shafts such as motor shafts, turbine shafts and other moving components conductively linked to components that create an electrical charge, or that may experience a build-up of electrical charge.

BACKGROUND ART

Shaft induced electrical current is experienced in electric motors, and commonly in three-phase motors driven by variable speed drives. Variable speed drives utilize pulse width modulation technology to vary the speed of AC motors, thereby allowing use of less-expensive AC motors in applications where more expensive DC motors had been used previously. A drawback to the use of AC motors with variable speed drives is that higher common mode voltage (CMV) is generated by the variable speed drive, which increases shaft induced currents.

Voltage on the motor shaft induces current flow through the shaft bearings to the motor frame and then to ground. While the motor is running, the bearings become more resistive to current flow, causing a buildup of charge on the shaft surfaces. Over a short period of time, the CMV causes electrical charges to build to a high level. As the electrical charges pass the threshold level of the least electrically resistive path, sometimes through the ball bearings on the shaft, an instantaneous burst or discharge of electrical energy passes along the path. The discharge can cause electric discharge machining (EDM) along the path, which can damage the surfaces of the bearing races and the balls in the bearing if the least resistive path is through the bearings. The electrical energy burst creates fusion craters, and particulate from the crater formation remains inside sealed bearing. Both the fusion crater and the particulate material in the bearing act to disturb the free rotation of the bearing, which can lead to physical damage and premature bearing failure.

A number of mitigation technologies are known to have been used in attempts to overcome this problem. Known attempts include using conductive bearing grease, insulating the bearings and using copper/phosphorus brushes and a Faraday shield. A common, somewhat cost-effective solution is to ground the shaft using spring-loaded copper brushes that provide a continuous flow of current to ground. However, copper brushes can wear out rapidly, requiring frequent, periodic service and replacement. Additionally, oxide build-up on the shaft and other barriers between the brushes and the shaft reduce the current flow and cause a burst of electrical energy across the brush and shaft. Spring-loaded brushes also tend to vibrate due to alternating frictional relationships between the brush and the shaft surface. Vibration of the brushes, from whatever cause, can result in undesirable sparking.

It is known to use grounding brushes that include conductive filaments in a holder surrounding the shaft. The brush with thin filaments can be used as a non-contacting ionizer to reduce electrical charges on the isolated shaft or on an isolated roller. The thin, light filaments can also be used as a contacting conductor against a rotating shaft or other moving surface. However, the effectiveness of the thin filament grounding brushes either as a non-contacting ionizer or as a contacting conductor can be compromised by properties of the surface with which it interacts. Corrosion of the shaft or other surface can adversely affect performance. The grounding performance of a new motor can decrease over time with corrosion of the shaft, and retrofitting a grounding system of this type can be problematic if the motor shaft is corroded.

What is needed in the art is a grounding system that can be used effectively for a prolonged period of time under adverse conditions, and which can be installed as a retrofit or incorporated into new assemblies.

DISCLOSURE OF THE INVENTION

The present invention provides a conductive component electrically connectable to a rotating shaft or other moving component for operating with a fixed brush in either a contacting or non-connecting relationship of a grounding brush system.

Other features and advantages of the invention will become apparent to those skilled in the art upon review of the following detailed description, claims and drawings in which like numerals are used to designate like features.

Figure 1:
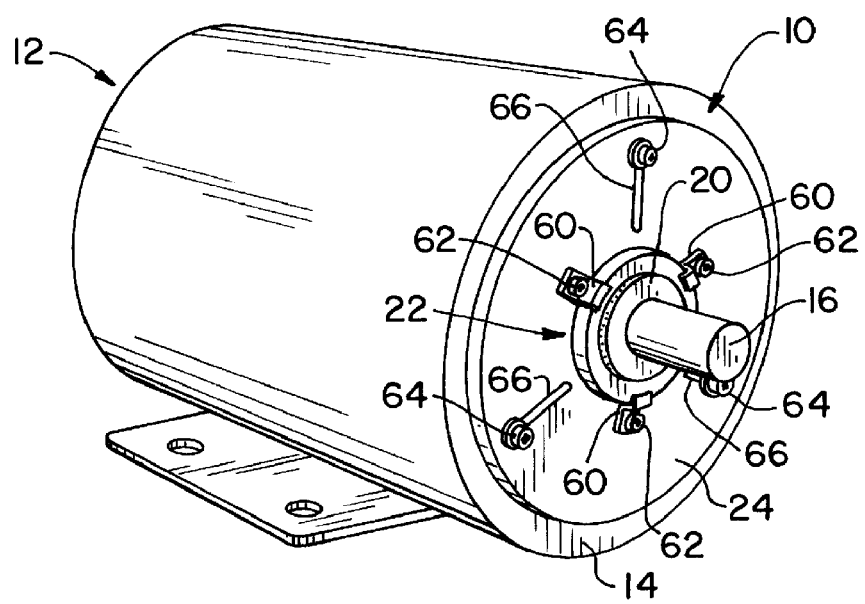
FIG. 1 is a perspective view of a motor having a grounding brush system in accordance with the present invention.
Figure 2:
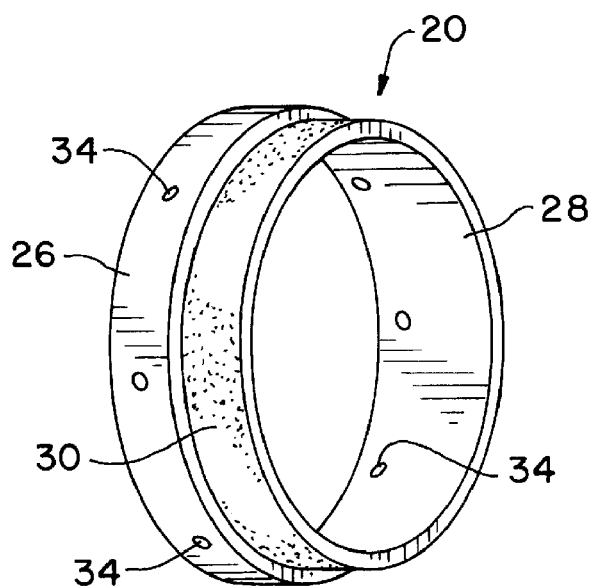
FIG. 2 is a perspective view of a shaft collar used in a grounding brush system shown in FIG. 1.
Figure 3:
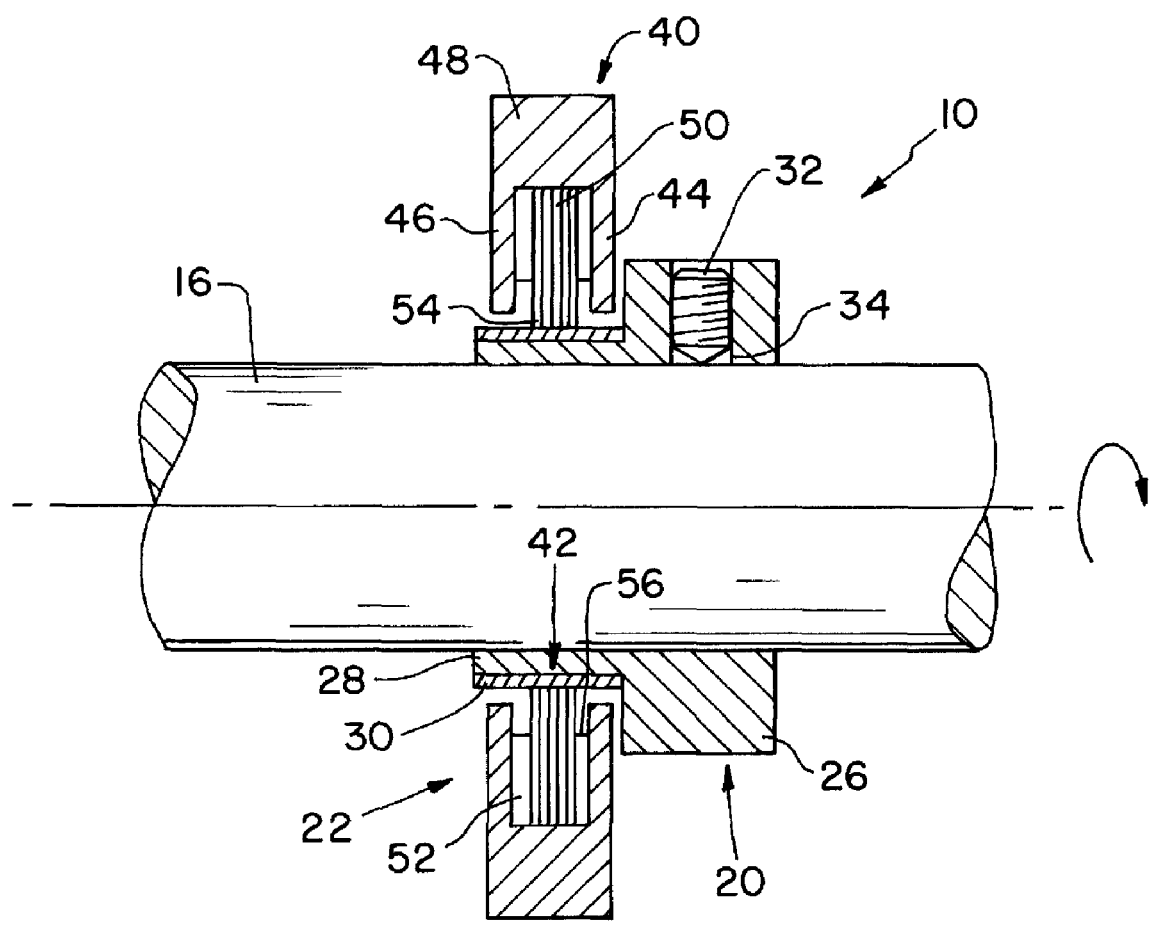
FIG. 3 is a fragmentary cross-sectional view of the motor and grounding brush system shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

BEST MODE FOR CARRYING OUT THE INVENTION

Referring now more specifically to the drawings and to FIG. 1 in particular, numeral 10 designates a grounding brush system in accordance with the present invention. Grounding brush system 10 is installed on a motor 12 and specifically against a housing faceplate 14 of motor 12 for dissipating electrical charges that may build up on a shaft 16 of motor 12. It should be understood that grounding brush system 10 can be provided in a variety of different sizes for use in motors of different types and on shafts 16 of different diameters. Grounding brush system 10 also can be used on rotating shafts of turbines, conveyors and other assemblies and constructions that may build up an electrical charge. Use of the present invention is not limited to electric motors, and motor 12 is shown and described only as one suitable and advantageous use for the present invention.

Grounding brush system 10 includes a shaft collar 20 mounted on and surrounding shaft 16 and a brush ring assembly 22 secured to motor faceplate 14 via a mounting plate 24. Brush ring assembly 22 generally surrounds collar 20 and is operatively arranged between shaft collar 20 and mounting plate 24 to dissipate static or other charges that build on motor shaft 16 during operation of motor 12 through the ground of motor 12.

Shaft collar 20 is adapted to increase the effectiveness of the microfiber grounding brush system for mitigating electrical currents on rotating surfaces. Collar 20 is made of or coated with highly conductive materials, such as, for example, silver, gold, copper or nickel. Preferably, the materials are both highly conductive and resistant to corrosion and other conductivity deteriorating phenomenon. While collar 20 can be made of such materials it also can be made of less expensive conductive materials and coated with highly conductive and deterioration resistant materials on the outer surface thereof in a position to interact electrically with brush ring assembly 22.

In the preferred embodiment shown, collar 20 includes an anchor ring 26 and a contact ring 28 adjacent anchor ring 26. Contact ring 28 has a highly conductive layer 30 of the highly conductive material, such as gold, silver, copper and nickel, for example, disposed on an outer surface thereof. In the inner diameter of collar 20 can be configured to engage the outer surface of shaft 16. Alternatively, collar 20 can be secured to shaft 16 via set screws 32 or the like received in threaded holes 34. Screws 32 establish intimate electrical contact between collar 20 and shaft 16. In another variation thereof, collar 20 can be of two or more segments clamped against shaft 16 to provide direct electrical contact of collar 20 against shaft 16. It should be understood also that in some applications of the present invention highly conductive layer 30 can be provided directly on a surface of a rotating shaft or other moving component to be grounded. For example, conductive inks or paints can be used and applied directly to the surface.

Brush ring assembly 22 includes an annular body 40 and a brush assembly 42 disposed therein. Body 40 includes an outer segment 44, an inner segment 46 and a base 48. Together, outer segment 44, inner segment 46 and base 48 form an annular channel in which brush assembly 42 is disposed. Body 40 is made of conductive materials, such as metal including, but not limited to aluminum, stainless steel, bronze and copper. Body 40 also can be made of conductive plastic.

Brush assembly 42 includes a plurality of individual fiber-like conductive filaments 50 that may be arranged individually in a substantially continuous annular ring, or in a plurality of fiber bundles arranged circumferentially around shaft 16. In one exemplary embodiment each filament 50 is a fine, hair-like filament made from carbon fibers, stainless steel, conductive plastics such as acrylic or nylon fibers, or any other conductive fiber-type filament that can be provided with diameters sufficiently small to induce ionization when in the presence of an electrical field. In such embodiment, conductive filaments 50 generally have diameters less than about 150 microns. In one arrangement, conductive filaments 50 are conductive filaments having diameters within a range of about 5 microns to about 100 microns. Alternatively, conductive filaments 50 can be larger fibers of conductive material that are held in contact with layer 30.

Conductive filaments 50 are secured within body 40 by an anchor structure. Anchor structure 52 is electrically conductive and may be in the form of clamping structure such as plates between which conductive filaments 50 are held. As yet another alternative, anchor structure 52 can be a conductive body of filler material such as conductive plastic, conductive adhesive or the like anchoring conductive filaments 50 in body 40. Portions of distal ends 54 of conductive filaments 50 extend past an inner surface 56 of anchor structure 52 and radially inwardly of outer and inner segments 44, 46 toward shaft 16 and layer 30 of collar 20 on shaft 16. When used with a smooth, corrosion resistant layer 30, the thin, lightweight conductive filaments 50 can physically contact layer 30 for direct transfer of electrical charge from shaft 16 without significant wear during operation. However, distal ends 54 of filaments 50 also can be provided in a closely spaced relationship to layer 30 such that, as an electric field is generated by charge building on shaft 16, an ionized field is created, allowing indirect transfer of charge from shaft 16 to filaments 50. In still another suitable arrangement, the fine, lightweight filaments 50 are in contact with layer 30 when motor 12 is at rest or is operating at slow speed. As the speed of shaft 16 increases during startup and use, air currents move filaments 50 away from layer 30.

Mounting plate 24 is made of electrically conductive material such as metal, including but not limited to aluminum, stainless steel, bronze and copper. Mounting plate 24 also can be made of electrically conductive plastics. Annular body 40 is held to mounting plate 24 by a plurality of clamps 60 and screws or bolts 62, three such clamps 60 with associated screws 62 being shown in the exemplary embodiment. It should be understood that more or fewer clamps 60 and associated screws 62 can be used, and other structure for securing annular body 40 to or against mounting plate 24 also can be used. In still other embodiments, mounting plate 24 and annular body 40 can be made as or fabricated to a single body. However, maintaining mounting plate 24 and annular body 40 as separate but connected structures allows for disassembly for servicing. For example, annular body 40 can be removed by releasing clamps 60 without disconnecting mounting plate 24 from a motor 12

Mounting plate 24 is connected to motor 12 by a threaded rod or bolt 64 extending axially into and/or through motor 12. Bolts 64 are received in elongated slots 66 provided in mounting plate 24. Accordingly, mounting plate 24 is adjustably positionable relative to motor 12 and can be used on motors of different diameters to receive bolts 64 positioned at different radial distances from shaft 16. In the exemplary embodiment, three bolts 64 and associated slots 66 are shown; however, mounting plate 24 of different configurations can be provided so as to accommodate different size and structures for motor 12.

Collar 20 is secured to shaft 16 to establish electrical conductivity between them. In retrofit applications the surface of shaft 16 can be cleaned to remove oxidation, dirt or other conductivity limiting substances. Electrical charge that builds on shaft 16 during use of motor 12 is transferred from shaft 16 to collar 20 by the direct physical contact established between them, including through set screws 32, anchor ring 26 and contact ring 28 to also build in layer 30. Transfer of charge from layer 30 to filaments 50 occurs directly by touching contact of filaments 50 against layer 30, or indirectly by ionization if a spaced relationship is provided between layer 30 and filaments 50. From filaments 50 the electrical charge can transfer through body 40 and mounting plate 24 to housing faceplate 14 and the ground connection of motor 12. Charges that build on shaft 16 are dissipated to ground through grounding brush system 10 before arcing can occur.

The relationship between and performances of layer 30 and conductive filaments 50 can be optimized by selecting materials that function well together for either minimally spaced close proximity and ionizing indirect transfer, or for physical touching and direct transfer from layer 30. Collar 20 establishes and maintains good electrical contact with shaft 16 even if exposed surfaces of shaft 16 corrode over time, and the properties of collar 16 and particularly layer 30 thereon maintain a high level of performance by grounding brush system 10.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electric motor comprising:
a motor housing faceplate;
a motor shaft extending outwardly of said faceplate;
a grounding brush system disposed around said shaft and secured to said faceplate, said grounding brush system including:
an electrically conductive collar disposed on and secured to said shaft; and
a brush assembly encircling said collar, said brush assembly being electrically connected and secured to an exterior surface of said faceplate and having conductive filaments with ends extending radially inwardly toward said collar, said conductive filaments having diameters sufficiently small to induce ionization in the presence of an electrical field from static charge on the motor shaft and said conductive collar, and said conductive filaments being in contact with said collar under some operating conditions of the motor and in a closely spaced relationship with said collar under other operating conditions of the motor.

2. The motor of claim 1, said collar having a layer of electrically conductive material.

3. The motor of claim 2, said layer being one of conductive plastic, silver gold, copper and bronze.

* * * * *